United States Patent
Sundaram et al.

(10) Patent No.: US 10,069,803 B2
(45) Date of Patent: *Sep. 4, 2018

(54) METHOD FOR SECURE NETWORK BASED ROUTE OPTIMIZATION IN MOBILE NETWORKS

(71) Applicant: Alcatel-Lucent USA, INC., Murray Hill, NJ (US)

(72) Inventors: Ganapathy Sundaram, Hillsborough, NJ (US); Violeta Cakulev, Milburn, NJ (US)

(73) Assignee: Alcatel-Lucent USA, INC., Murray Hill, NJ (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/981,828

(22) Filed: Dec. 28, 2015

(65) Prior Publication Data
US 2016/0119297 A1  Apr. 28, 2016

Related U.S. Application Data

(63) Continuation of application No. 12/369,374, filed on Feb. 11, 2009, now Pat. No. 9,258,696.

(51) Int. Cl.
| | |
|---|---|
| *H04W 8/08* | (2009.01) |
| *H04L 29/06* | (2006.01) |
| *H04L 29/08* | (2006.01) |
| *H04W 60/00* | (2009.01) |
| *H04W 80/04* | (2009.01) |
| *H04W 88/16* | (2009.01) |

(52) U.S. Cl.
CPC ........ *H04L 63/0428* (2013.01); *H04L 67/148* (2013.01); *H04W 8/082* (2013.01); *H04L 2463/061* (2013.01); *H04W 60/00* (2013.01); *H04W 80/04* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,200,750 B1 * | 4/2007 | Knisely | H04L 63/061 713/171 |
| 2002/0080752 A1 | 6/2002 | Johansson et al. | |

(Continued)

FOREIGN PATENT DOCUMENTS

EP     1916224 A1    10/2008

OTHER PUBLICATIONS

Office Action dated Nov. 20, 2017 for European Patent Application No. 10701777.4, 4 pages.

*Primary Examiner* — Chirag Shah
*Assistant Examiner* — Amar Persaud

(57) ABSTRACT

The present invention provides a method of route optimization involving a first mobile device associated with a first home gateway. One embodiment of the method is implemented in a first mobility forwarding entity and includes registering the first mobile device at the first mobility forwarding entity. The first mobile device is registered using a session key included in a registration message transmitted by the first mobile device. The embodiment also includes establishing a secure route between the first mobility forwarding entity and a terminating node using the session key. The secure route bypasses the first home gateway.

23 Claims, 5 Drawing Sheets

(56) References Cited

U.S. PATENT DOCUMENTS

| | | | |
|---|---|---|---|
| 2003/0177385 A1* | 9/2003 | Price | H04L 63/08 713/171 |
| 2007/0189537 A1* | 8/2007 | Zhang | H04L 9/083 380/273 |
| 2008/0069105 A1* | 3/2008 | Costa | H04L 63/0853 370/392 |
| 2008/0259850 A1* | 10/2008 | Dai | H04W 60/00 370/328 |
| 2009/0010223 A1* | 1/2009 | Hirano | H04W 8/082 370/331 |

* cited by examiner

METHOD FOR SECURE NETWORK BASED ROUTE OPTIMIZATION IN MOBILE NETWORKS

CROSS REFERENCE TO RELATED APPLICATIONS

This application is a continuation of U.S. patent application Ser. No. 12/369,374, entitled "METHOD FOR SECURE NETWORK BASED ROUTE OPTIMIZATION IN MOBILE NETWORKS" and filed on Feb. 11, 2009, the entirety of which is incorporated by reference herein.

BACKGROUND OF THE INVENTION

1. Field of the Invention

This invention relates generally to communication systems, and, more particularly, to wireless communication systems.

2. Description of the Related Art

Conventional wireless communication systems provide wireless connectivity using radio access networks or other wireless entities such as access points, base stations, base station routers, and the like. For example, a mobile unit may establish a wireless communication link over an air interface with a radio access network that is a communicatively coupled to a network. The mobile unit may use the wireless communication link to access services provided by the network such as establishing a communication session with another mobile unit. The information transmitted using the communication session between the two mobile units may be analog or digital information and the communication path between the mobile units may be formed using a circuit-switched architecture or a packet-switched architecture. In a circuit-switched architecture, a dedicated communication path is formed between, for instance, two mobile units and may only be used by the two mobile units. In contrast, packet-switched architectures divide the information up into packets that can be transmitted along numerous paths between the two mobile units using a common packet network infrastructure for forwarding the packets between the mobile units and their network peers. Thus, some or all of the paths through a packet-switched network infrastructure may be shared by other mobile units or other entities coupled to the packet-switched network such as a network server or a fixed subscriber. Moreover, almost all packet-switched wireless systems rely on the Internet Protocol (IP) for routing and forwarding. Packet switched networks are more open and hence vulnerable to attacks. Security is therefore of primary importance in packet-switched networks.

A wireless communication system can be conceptually structured into a multiple layer model. For example, the Open Systems Interconnection (OSI) Reference Model includes seven layers: the application layer, the presentation layer, the session layer, the transport layer, the network layer, the data link layer, and the physical layer. The application layer is the "highest" layer and so it is closest to the end user. The application layer includes software for providing various applications. The presentation layer establishes a context and translates between different application layer entities. The session layer controls sessions established between different computers and manages connections between local and remote applications. The transport layer provides transparent data transfer between end-users and supports reliable data transfer services to upper layers. The network layer provides the functional and procedural support for transferring variable length data sequences from a source to the destination via one or more networks. The data link layer provides the functional and procedural support for transferring data between network entities, as well as providing error correction. The physical layer is the "lowest" layer, which defines the electrical and physical specifications, as well as encoding and modulation schemes needed for error-free transmission between devices.

Numerous wireless access technologies may be implemented at the physical layer and link layer to support packet data applications. Some exemplary wireless access technologies include second generation (2G), third generation (3G), and fourth generation (4G) technologies such as HRPD, 1×-EVDO, UMTS/HSPA, WIMAX/IEEE-802.16, 3GPP2-UMB, and 3GPP-LTE. These wireless access technologies operate according to standards and/or protocols such as the standards and/or protocols established by the Third Generation Partnership Projects (3GPP, 3GPP2) and WiMAX Forum Network Working Group (NWG). To take advantage of the different signal strengths and existing coverage areas of the already deployed technologies, equipment vendors are developing and deploying dual mode (or multi-mode) mobile units that are capable of communicating using multiple wireless access technologies. For example, a dual-mode mobile unit may implement two independent means of IP connectivity that operate according to two different wireless access technologies. At the same time, service providers are increasingly using more than one wireless access technology to provide wireless connectivity. For example, some service providers have deployed heterogeneous networks that include overlaid meshes and/or overlapping coverage areas with different access technologies. The overlaid meshes and overlapping coverage areas may be used as part of an evolution from a legacy technology to a newer technology or for other reasons, such as reducing deployment and/or operating costs, improving the overall communication spectrum characteristics, and the like.

Application layer technologies are also evolving rapidly. For example, new browser technologies are fast replacing older WAP based methods and almost every Internet application is on the cusp of being 'mobilized' to cater to mobile subscribers. More Internet Protocol (IP) based mobile-to-mobile services are also being introduced to compliment and upgrade existing cellular mobile-to-mobile services. Examples of these mobile to mobile services include Mobile VoIP complimenting existing cellular voice services, and Mobile IM with text, audio, and video sharing exploring richer versions of conventional cellular SMS. Voice over Internet Protocol (VoIP) is a technique for encoding audio signals (such as voice signals) into a digital format that can be used to form packets for transmission over a packet-switched network which uses the Internet Protocol (IP) at the network layer. The VoIP packets are typically referred to as delay-intolerant and jitter sensitive information because large delays in transmission from transmitter to receiver or between successive packets at the destination VoIP session peer (e.g., mobile unit) may degrade the quality of the audio signal produced by the source peer. Consequently, VoIP applications are typically constrained to provide VoIP packets at a selected quality-of-service (QoS) level. For example, a VoIP application implemented in a mobile unit may be required to maintain minimum levels of delay, delay jitter, and the like for packets transmitted over the network. In some cases, customers may pay larger fees to obtain overall higher QoS levels of higher QoS levels for certain applications.

A typical wireless access network is conventionally divided into two components: the radio network and the core network. The conventional core network includes two levels of IP gateways that allow mobile units to access the Internet, as illustrated by the communication network 100 shown in FIG. 1. Visited gateways (VGW) provide an interface between the core network and the radio network, which includes entities such as base stations, base station controllers, base station routers, access points, and the like. Home gateways (HGW) communicate with the visited gateways and provide an interface between the core network and the Internet. The home gateway is typically responsible for IP address assignment and management in addition to serving as the gateway to the Internet. The home gateway and the visited gateway may be separated by one or more peering networks, particularly when the home gateway and the visited gateway are operated by different service providers and/or when the two gateways are geographically or topologically distant from each other, as illustrated by the communication network 200 shown in FIG. 2.

The home gateway, the visited gateway, and any peering networks between these gateways can become choke points for packets traveling to or from the Internet. For example, if two mobile units have an established call session, the core network gateways for the two mobile units may be in two different cities. The base stations that provide the air interfaces may also be in completely different cities than any of the core network gateways. In some cases, the route between a base station and a home gateway may traverse through multiple peering networks in different cities due to peering relationships across backbone operators. Depending on the topology of the network, even calls that are served by the same visited gateway may be routed through numerous gateways and/or peering networks. For example, a call between two users (one from New York City and one from Los Angeles) who are attending a conference in Chicago may have to be routed from Chicago to New York City to Los Angeles and then back to Chicago even though the users may be in the same building when the call is placed. This scenario is sometimes referred to as the "triangle routing problem" because packets are routed from an Internet host through a home agent to a mobile node (i.e., along two legs of a triangle) despite the presence of a direct path from the Internet host to the mobile node (i.e., the hypotenuse of the triangle).

The diversity of real communication networks significantly complicates the triangle routing problem. Due to the geographic diversity in the locations of the user, the radio network, the visited gateway of the core network, and transport within the core network, operators are forced to use various peering points to route traffic to the Internet. In effect, multiple clusters of networks are created with routing and forwarding paths dictated by various standards and peering policies, which can introduce inefficiencies. For example, forced routing of the mobile unit calls through multiple peering points may result in a dramatic increase in end-to-end latency that translates to end-user dissatisfaction, as well as increased cost in transport that may lead to added operating expense (OPEX). The choke points also have the potential to create inefficiencies and large scale outages due to an inherent lack of fault-tolerance. These drawbacks may undermine the efficiency of access to the network provided by evolution in the physical layer and application layer technologies. These effects may also be exaggerated by the fact that a significant percentage of mobile-to-mobile calling may be limited to within a geographic region potentially served by the same visited gateway.

Various Internet-wireless standards drafts and research publications have suggested approaches to ameliorate the triangle routing problem. One technique is a client-based route optimization technique that was adopted as a part of Mobile IPv6. However, this technique requires involvement of the client (e.g., the Internet host and/or the mobile node) and is performed once for each correspondent node. Furthermore, the protocol only applies when both the mobile node and the correspondent node are compliant with IPv6 and can be addressed using IPv6 home and care-of addresses. The client-based route optimization techniques have not been widely implemented because they are elaborate, cumbersome, and prone to security lapses.

Another approach to addressing the triangle routing problem is a policy based local breakout technique that uses multiple IP addresses for the client and routes specific flows based on policies. The policy-based local breakout techniques are primarily intended to address subscribers that roam from one network to another and/or between multiple service providers. As an example, consider an Asian subscriber visiting a US network. In this case, the policy-based local breakout technique would assign the subscriber to two 'home' gateways—one in Asia and the other in the US. One or more policies may then be used to determine how calls are routed. For example, the policies may dictate that latency sensitive calls are routed locally using an IP address assigned by the US home gateway. The policies may further dictate that other applications are routed only through the home gateway in Asia (e.g., a music service in the subscriber's language). Applications that are routed through the Asian home gateway will address the user's mobile using the IP address assigned by the Asian home gateway.

Another alternative is to utilize media-aware routing concepts that can be used in heterogeneous networks that communicate with various types of devices (both wired and wireless). For example, a system that implements media-aware routing may attempt to provide an optimal route based on the type of media that is being transmitted. For example, VoIP calls may be routed according to one policy, streaming video may be routed according to another policy, and text messages may be routed according to yet another policy.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for route optimization involving a first mobile device associated with a first home gateway. One embodiment of the method is implemented in a first mobility forwarding entity and includes registering the first mobile device at the first mobility forwarding entity. The first mobile device is registered using a session key included in a registration message transmitted by the first mobile device. The embodiment also includes establishing a secure route between the first mobility forwarding entity and a terminating node using the session key. The secure route bypasses the first home gateway.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
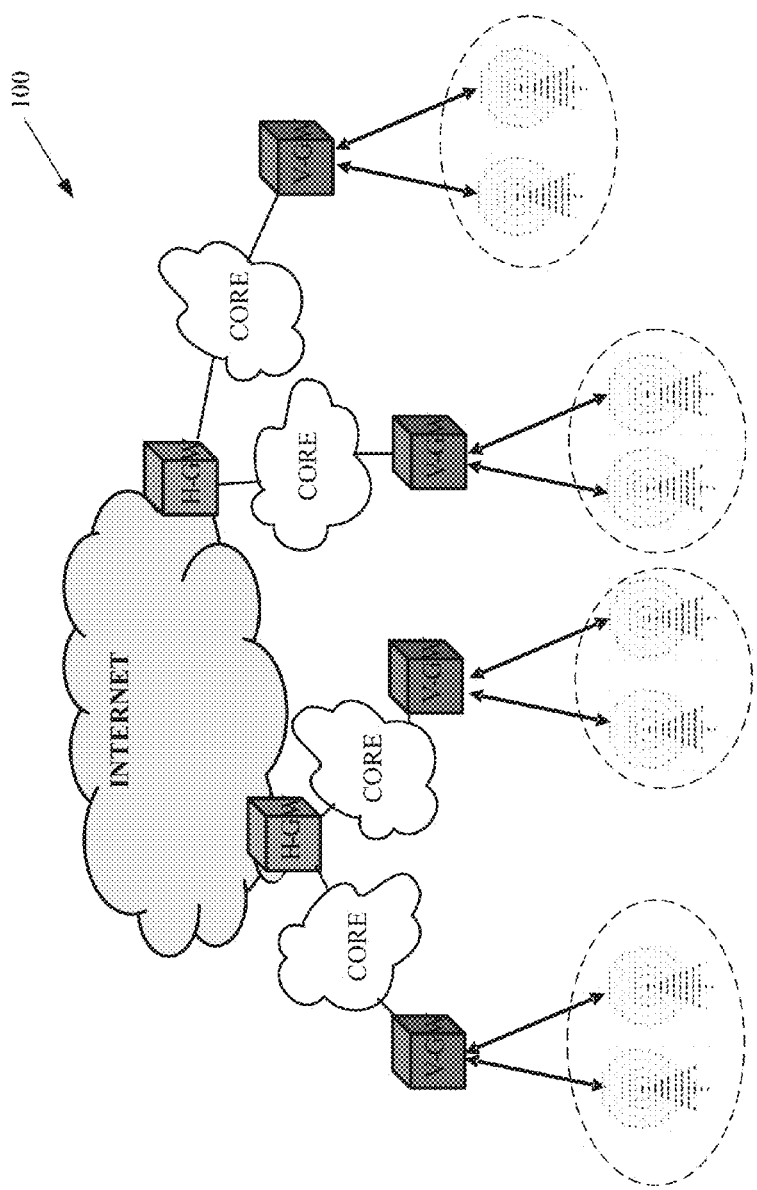
FIG. 1 conceptually illustrates an exemplary wireless communication system.
Figure 2:
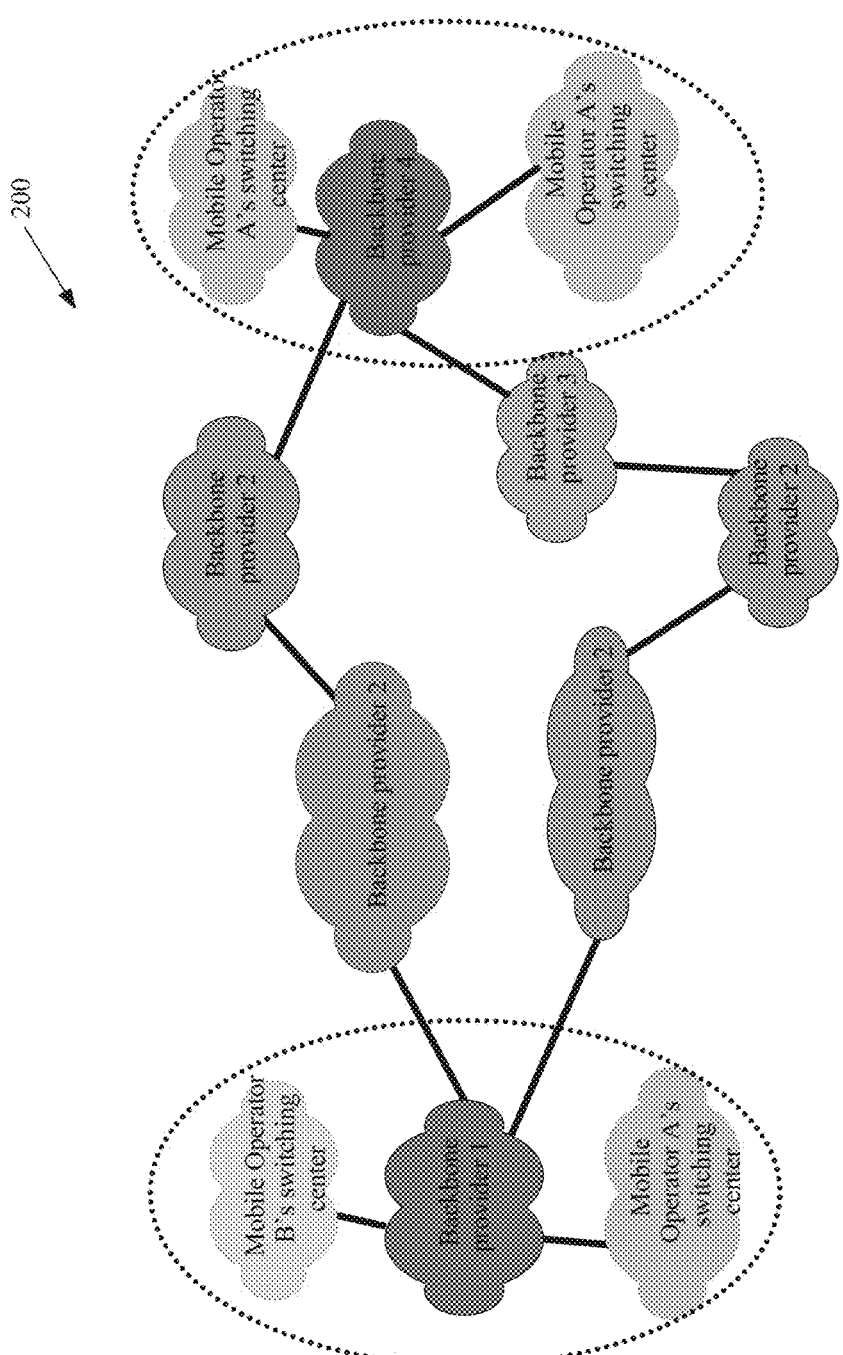
FIG. 2 conceptually illustrates a conventional network of mobile switching centers and inter-connections through various peering networks.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally speaking the subject of the present application is secure proxy based (or network-based) route optimization that provides high end-user Quality of Experience (QoE) by reducing latency. The techniques described herein may also improve network efficiency leading to a full fledged public land mobile data network (PLMN), which may also be referred to as a mobile Internet. Embodiments of the secure proxy based route optimization techniques described herein implement one or more of the following design principles:

The optimized routes provide secure routing that eliminates well known Denial of Service (DoS) attacks. In addition, secure routing should work between multiple mobile operators in an optimal fashion.

Network (or proxy) based route optimization techniques may be adopted to minimize client input as well as traffic over the air-interface, which is expensive. Using network based methods also provides implicit protection to clients and may reduce the role of the client device and thereby simplify operation/design of the client device and conserve battery power.

The secure route optimization techniques reflects an evolutionary approach that supports inter-working and/or backwards compatibility with existing standards, mobile networks, and the Internet. Embodiments of the secure route optimization techniques described herein may therefore work for legacy mobile and Internet protocols such as IPv4, as well as IPv6, and may work seamlessly across multiple access networks independent of the macro-mobility management protocols that are implemented in the access network. Some embodiments of the secure route optimization techniques described herein may therefore be treated as enhancements to existing standards and networks, thereby enabling the gradual roll-out of the secure route optimization techniques.

In one embodiment, the secure route optimization technique described herein may be implemented by introducing two new functional entities that are referred to herein as a Mobility Routing Entity (MRE) and a Mobility Forwarding Entity (MFE). However, persons of ordinary skill in the art should appreciate that different embodiments of these functional entities may be referred to using different terminology. Using the new functional entities may allow easy integration and inter-operation with existing mobile data networking standards, products, as well as the Internet. As used herein, the term "routing" will be understood to mean creation of the policies, tables, and control plane paths that are used to route data through a wireless indication system. As used herein, the term "forwarding" will be understood to mean the process of acting on the policies created by routing functions to move information (usually in the form of packets) through the wireless communication system.

Secure route optimization is primarily discussed herein in the context of two mobile devices communicating through a (possibly heterogeneous) wireless communication system. Both of the mobile devices can access the wireless communication system over different air interfaces. However, persons of ordinary skill in the art having benefit of the present disclosure will appreciate that the techniques described herein may be used to establish secure routes between a roaming mobile device and any other endpoint or terminating node in the wireless communication system or outside in the Internet. For example, the techniques described herein may be used to establish a secure route between a mobility forwarding entity associated with a roaming mobile device and a server that provides a web service that is being accessed by the roaming mobile device. In this scenario, secure route optimization can establish a secure route between the mobility forwarding entity and the server using an IP address or other identifier of the server.

Embodiments of the secure route optimization techniques described herein have a number of advantages over existing techniques. Security is provided in voice networks primarily by the closed nature of circuit networks. Similarly, the local-breakout techniques implemented in $2^{nd}$ generation cellular networks are based on local trunking, which is ostensibly a circuit concept. Consequently, these techniques do not provide sufficient security for current and future IP based (i.e., open) mobile data networks. The secure route optimization techniques described herein provide secure pathways through the heterogeneous open networks implemented in Third Generation (3G) and subsequent cellular networks. Moreover, $2^{nd}$ generation cellular had the luxury of introducing innovation without regards to existing networks since the first generation cellular deployments were few and far between at that time. However, the landscape for emerging cellular data networks is vastly different and has to respect existing standards and networks that support a large nucleus of close to a billion mobile data subscribers. Backwards compatibility of the secure route optimization techniques described herein may help facilitate integration with existing and emerging cellular data networks.

Figure 3:
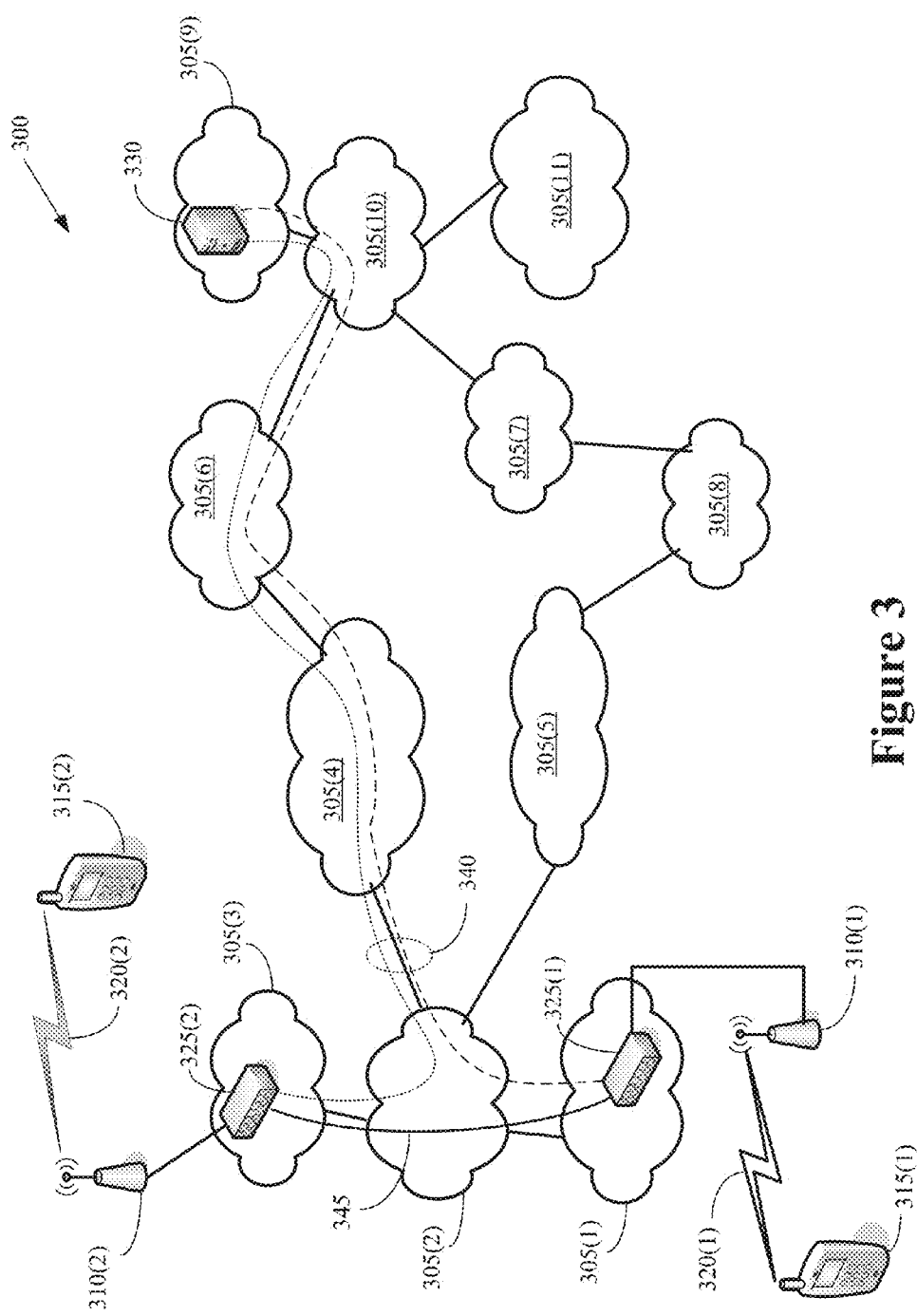
FIG. 3 conceptually illustrates a first exemplary embodiment of a wireless communication system that supports secure proxy-based route optimization.

Referring now to FIG. 3, a first exemplary embodiment of a wireless communication system 300 is shown. In the illustrated embodiment, the wireless communication system 300 includes numerous interconnected provider networks 305(1-11). The distinguishing indices (1-11) may be used to refer to individual provider networks or subsets of the provider networks. However, these indices may be dropped when referring to the provider networks 305 collectively. This convention may be applied to other elements depicted in the drawings and identified by a numeral and one or more distinguishing indices. Persons of ordinary skill in the art having benefit of the present disclosure should appreciate that the provider networks 305, which may also be referred to as backbone provider networks 305, can operate according to a variety of standards and/or protocols. For example, the wireless communication system 300 may be a heterogeneous system that includes provider networks 305 that operate according to a mixture of 2G and 3G standards and/or protocols. Furthermore, techniques for the implementation and the operation of the provider networks 305 are known in the art and in the interest of clarity only those aspects of implementation and operation of the provider networks 305 that are relevant to the subject matter described in the present application will be discussed further herein.

The wireless communication system 305 also includes wireless access points 310 that are used to provide wireless connectivity. Only two wireless access points 310 are depicted in FIG. 3, but persons of ordinary skill in the art having benefit of the present disclosure should appreciate that the wireless communication system 305 may include many more access points 310. Furthermore, the access point 310 may include base stations, base station routers, Bluetooth access points, access points that operating according to IEEE 802 protocols, and the like. Mobile units 315 may therefore access the wireless communication 305 over air interfaces 320 between the mobile units 315 and the access points 310. The mobile units 315 may also be referred to using terms such as mobile node, correspondent node, mobile station, user equipment, subscriber equipment, subscriber station, and the like.

In the illustrated embodiment, the mobile unit 315(1) is attached to a base station 310(1) which is in turn connected to a visited gateway 325(1) that is implemented in the provider network 305(1). The mobile unit 315(2) is attached to a base station 310(2) that is connected to a visited gateway 325(2) implemented in the provider network 305(3). In the illustrated embodiment, both of the mobile units 315(1-2) are anchored at the same home gateway 330. This scenario, where the visited gateways 325 are geographically and/or topologically separated from the home gateway 330, is fairly typical since the number of visited gateways 325 is typically far larger than the number of home gateways 330. Moreover, home gateways 330 may be centralized in order to make it easier for the home gateways 330 to assign and manage IP addresses and policies. However, persons of ordinary skill in the art having benefit of the present disclosure should appreciate that in alternative embodiments the mobile units 315 may be anchored in different home gateways 330.

A conventional path 340 through the home gateway 330 involves transport through multiple backbone networks 310 and peering points, as shown in FIG. 3. The multiple backbone networks 310 and/or peering points in the conventional path 340 can lead to delays, lost packets, increased latency, and other drawbacks that can degrade a user's Quality of Experience. In operation, secure route optimization can be used to generate a secure optimized path 345 between the visited gateways 325. In the illustrated embodiment, the secure optimized path 345 bypasses the home gateway 330 and therefore reduces the number of intervening provider networks 305, relative to the conventional path 340. The secure route optimization includes registration of the mobile unit 315(1), discovery of the visited gateway 325(2) associated with the mobile unit 315(2), establishing the secure route 345 between the visited gateways 325, and then forwarding packets over the secure route 345. In the illustrated embodiment, the mobile unit 315(1) authorizes the visited gateway 325(1) to perform secure route optimization and then the mobile unit 315(1) delegates responsibility for this functionality to the visited gateway 325(1). In this case, only the mobile unit 315(1) has 'rights' to any given flow and any changes in routes may be authorized by the mobile unit 315(1), which then delegates responsibility to the visited gateway 325(1) to perform such actions.

In one embodiment, the visited gateways 325 may each support a Mobility Forwarding Entity (MFE, not shown in FIG. 3) that is a logical entity used to implement the secure route optimization functionality. The MFE also interacts with a Mobility Routing Entity (MRE) to identify other MFEs that can be used as the endpoints for the secure route that is defined and used to transport packets between the mobile units 315. In one embodiment, the MRE is a large distributed database that provides information about visited location of mobile units 315 as well as identities of visited networks 325. Although FIG. 3 depicts communication between two mobile units 315. Persons of ordinary skill in the art should appreciate that the techniques described herein may also be used to provide secure route optimization between a mobility forwarding entity associated with one mobile unit 315 and any other network endpoint or terminating node, such as a server for a website that is identified by an IP address.

Figure 4:
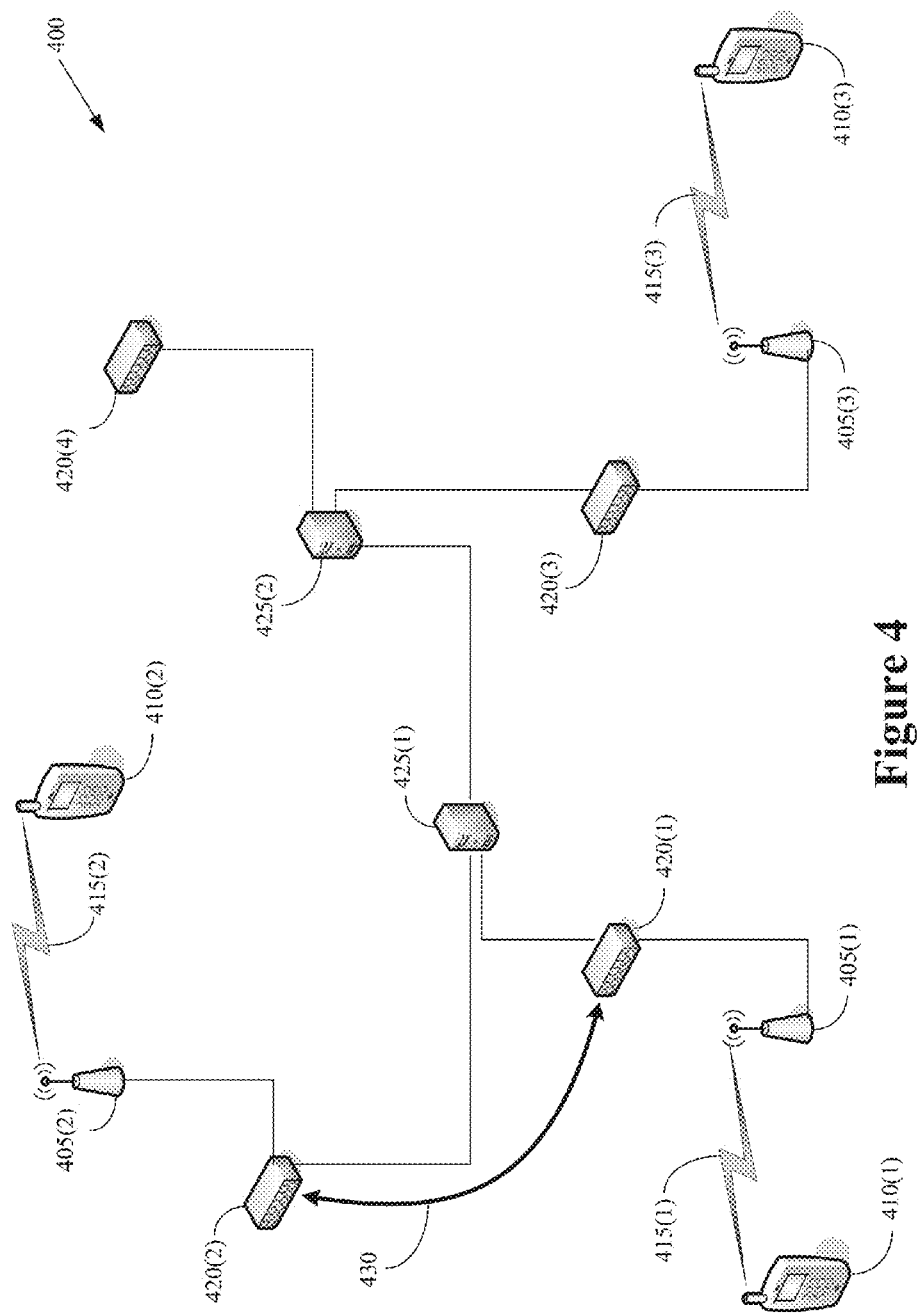
FIG. 4 conceptually illustrates a second exemplary embodiment of a wireless communication system that supports secure proxy-based route optimization.

FIG. 4 conceptually illustrates a second exemplary embodiment of a wireless communication system 400. In the illustrated embodiment, the wireless communication system 400 includes base stations 405 that are used to provide wireless connectivity to mobile units 410 over air interfaces 415. The second exemplary embodiment of the wireless communication system 400 also includes a plurality of mobility forwarding entities 420 that are communicatively coupled to the base stations 405. One or more mobility routing entities 425 are also included in the wireless communication system 400. In various alternative embodiments, the mobility routing entities 425 may be independent or may be part of a distributed mobility routing entity 425. Persons of ordinary skill in the art having benefit of the present disclosure should appreciate that the particular number of entities and interconnections between these entities shown in FIG. 3 is intended to be illustrative and alternative embodiments may include different numbers of these entities that are interconnected in a different fashion.

The various entities depicted in the second exemplary embodiment shown in FIG. 4 may, in some cases, overlap with and/or be implemented in entities shown in FIG. 3. For example, one or more of the mobility forwarding entities 420 and/or the mobility routing entities 425 may be implemented in one or more of the visited gateways 325 or home gateways 330 shown in FIG. 3. However, persons of ordinary skill in the art having benefit of the present disclosure should appreciate that this is not necessary for the practice of the techniques described herein. In some embodiments, the mobility forwarding entities 420 and/or the mobility routing entities 425 may be stand-alone entities implemented independently of the visited gateways 325 and the home gateways 330, e.g., the mobility entities may be implemented in different "boxes" that may be deployed in different physical locations.

In the illustrated embodiment, the mobile unit 410(1) is attached to the base station 405(1), which can in turn communicate with the mobility forwarding entity 420(1). The mobile unit 410(1) may attempt to establish a call session with the mobile unit 410(2), which is attached to the base station 405(2) and the mobility forwarding entity 420(2). The secure route optimization may then be performed to allow packets to be tunneled directly between the mobility forwarding entities 420(1-2) over the secure route 430.

The secure route optimization technique begins with the mobile unit 410(1) registering with the mobility forwarding entity 420(1). In one embodiment, a multi-step registration process is used to enforce policy based route optimization and enable the mobile unit 410(1) to delegate authority to the mobility forwarding entity (or visited gateway) 420(1) to perform the secure route optimization. Registration may also allow the wireless communication system 400 to verify if the mobile unit 410(1) is authorized to invoke secure route optimization services in the network. For example, the mobile unit 420(1) may solicit an advertisement to request that the mobility forwarding entity 420(2) sends an advertisement for secure proxy-based (or network-based) route optimization and/or other services that may be provided by the mobility forwarding entity 420(1). The mobility forwarding entity 420(1) may then advertise the route optimization services offered and, in some cases, exchange nonces with the mobile unit 410(1) for registration and delegation. In addition, the mobility forwarding entity 420(1) may advertise other services and performance enhancements, which may include header compression, firewall services, encryption, and the like.

The mobile unit 410(1) may then transmit a signed binding registration to the mobility forwarding entity 420(1), which may return a binding acknowledgement. However, persons of ordinary skill in the art should appreciate that the present technique is not limited to transmission of binding registrations and/or binding acknowledgements and alternative embodiments may support exchange of other messages. The binding registration from the mobile unit 410(1) may include a service ID associated with the secure route optimization service. The mobile unit 410(1) may choose to pick additional services as well and may indicate the additional services in the binding registration. The binding acknowledgement from the mobility forwarding entity 420(1) may include nonces that the mobile unit 410(1) could use for subsequent communication. The binding may have a finite time to live and so the mobile unit 410(1) may need to re-register before expiry of registration if it wants to continue using the binding. A successful binding registration and acknowledgement indicates that the mobile unit 410(1) delegates the authority to the network to perform secure route optimization (and other services) and that the network acknowledges that the mobile unit 410(1) is authorized for such services. In one embodiment, the mobile unit 410(1) and the mobility forwarding entity 420(1) share a session key that is designated for both binding registration and acknowledgement and can be used to sign the binding registration. In one embodiment, the session key may be derived from a previous access authentication procedure.

Once the mobile unit 410(1) is registered with the mobility forwarding entity 420(1), discovery may be performed to locate the mobility forwarding entity 420(2) that is proximate to the mobile unit 410(2). Discovery may be performed concurrently with the call setup or after traffic flow has commenced. In one embodiment, the mobile unit 410(1) picks a nonce from the list of nonces sent in the binding acknowledgement and sends a request message with the IP address of the destination mobile unit 410(2) and secure proxy-based route optimization service ID. The request message can be signed using the session key. If the mobile unit 410(1) already has an ongoing flow with the same destination mobile unit 410(2), then the source mobile unit 410(1) includes the source and destination port numbers for the new flow (in addition to the destination IP address) in the signed message.

At this point in the protocol, the mobility forwarding entity 420(1) is potentially unaware of the visited network that anchors the destination mobile unit 410(2). The source mobility forwarding entity 420(1) may therefore send a secure request to a local mobility routing entity 425(1) with the IP address of the destination mobile unit 410(2). In the illustrated embodiment, the mobility routing entity 425(1) maintains a distributed database that provides information about visited location of mobiles as well as identities of visited networks. The mobility routing entity 425(1) may therefore search the distributed database using the IP address of the destination mobile unit 410(2) to locate the destination IP address of the mobility forwarding entity 420(2). The mobility routing entity 425(1) may also need to contact another mobility routing entity (e.g., 425(2)) to obtain the visited coordinates of the mobile unit 410(2) (e.g., the IP address of the destination mobility forwarding entity 420(2)). The mobility routing entity 425(1) may then return the IP address of the destination mobility forwarding entity 420(2), as well as the domain name or identity of the destination mobility forwarding entity 420(2).

In scenarios in which the mobile unit 410(1) is accessing a web service provided by a server (not shown in FIG. 4), one endpoint of the secure route is the server, which may not have an associated mobility forwarding entity 420. The communication path between the mobile unit 410(1) and the server therefore may not include a second mobility forwarding entity 420. Instead, the mobility forwarding entity 420(1) can use a known IP address or other identifier of the server to identify the server as the appropriate endpoint for the route optimization procedure. The mobility forwarding entity 420(1) may therefore be able to identify the server without necessarily communicating with the mobility routing entity 425(1).

The information identifying the destination mobility forwarding entity 420(2) may be cached by the source mobility forwarding entity 420(1) for future forwarding decisions. In other words this step may not have to be executed if the source mobility forwarding entity 420(1) is already aware of the identity and IP address of the destination mobility forwarding entity 420(2). Caching the identifying information (e.g., the IP address and/or the domain name or identity of the destination mobility forwarding entity 420) may allow this information to be accessed relatively quickly in cases where this information has already been provided to the source mobility forwarding entity 420. Consequently, caching the identifying information may significantly improve the performance of the system by reducing latency. If the mobility routing entity 425(1) cannot locate the IP address of the destination mobility forwarding entity 420(2) in its database, it may forward requests for this information to other entities within the wireless communication system 400, such as other mobility routing entities 425(1), and use this information to populate the database and return the requested information.

The secure route 430 can then be established between the source and destination mobility forwarding entities 420(1-2). In one embodiment, a mutually authenticated key agreement is negotiated between the source and destination mobility forwarding entities 420(1-2) in order to set up the secure route 430. Different procedures may be followed depending on whether the destination and source mobility forwarding entities 420(1-2) have established an active session.

In scenarios when the destination and source mobility forwarding entities 420(1-2) haven't established an active session between themselves, the source mobility forwarding entity 420(1) executes an authenticated key exchange procedure with the destination mobility forwarding entity 420(2) based on the identities of the source and destination mobility forwarding entities 420(1-2). The forwarding entities may not have a pre-shared key, in which case the authenticated key exchange may be performed using certificates or Identity Based Encryption (IBE) protocols. The advantage of the IBE based mutually authenticated key agreement is the inherent simplicity (no PKI), while maintaining perfect forward secrecy with no key-escrow. Once this step is executed, the source mobility forwarding entity 420(1) sends a signed binding registration to the destination mobility forwarding entity 420(2) including IP addresses of source and destination mobiles 410(1-2). This registration effectively informs the destination mobility forwarding entity 420(2) of the intent to optimize routes for the flow. In response, the destination mobility forwarding entity 420(2) acknowledges the binding if the destination mobile unit 410(2) is anchored at the destination mobility forwarding entity 420(2). The destination mobility forwarding entity 420(2) also acknowledges that the destination mobile unit 410(1) is registered for secure proxy-based route optimization with the destination mobility forwarding entity 420(2). Prior to sending the binding acknowledgment, the destination mobility forwarding entity 420(2) may optionally choose to verify the location of the source mobile unit 410(1) by contacting the local mobility forwarding entity 420(1). The verification step may prevent a rogue MFE from setting up a fake flow.

In scenarios where the source and destination mobility forwarding entities 420(1-2) already share an active session, e.g., because they have authenticated each other and have a session key due to a prior secure proxy-based route optimization request between the same mobility forwarding entities 420(1-2) for some other call between potentially different mobiles. In this scenario, the binding registration and binding acknowledgements are executed but the authenticated key agreement step can be skipped. If the source and destination mobile units 410(1-2) already share an active session, then the source mobility forwarding entity 420(1) may include source and destination ports (in addition to IP addresses of mobiles) in the registration message.

Packets may then be forwarded over the secure route 430. Packets received from the source mobile unit 410(1) contain the IP address of the destination mobile unit 410(2) as the destination IP address and hence any change in path will require a modification of the packet in order to ensure intermediate routers do not reject the packet. This can be accomplished in multiple ways, including tunneling, network address translation, and modification of the routing header.

Tunneling can be accomplished by establishing an IP-in-IP (or GRE) tunnel between the mobility forwarding entities 420(1-2). Examples of analogous tunneling techniques are the tunneling techniques used in Mobile IP, GTP, as well as Proxy Mobile IP. In one embodiment, header compression may be used to minimize packet overheads prior to encapsulation of the packets.

Network Address Translation mechanisms may also be implemented. For example, mobile specific visited addresses that are specific to the visited domains may be exchanged when the mobility forwarding entities 420(1-2) exchange binding registrations and acknowledgements. In other words, both mobility forwarding entities 420(1-2) can create mobile specific co-located care-of addresses for their respective mobiles and exchange them. Once this is done, when packets are sent by the mobile to the MFE (either upstream or downstream) the appropriate network address translations are made where the IP address of the mobiles are replaced with their corresponding co-located care of addresses. Similarly, when an MFE is getting ready to send a packet to the mobile the reverse translation from co-located care of addresses to the IP address of the mobiles (as assigned by the home network) will be made. Such procedures are applicable to both IPv4 and IPv6 mobiles and the co-located care-of address for a given mobile need not be known to the mobile.

Router headers may be used. e.g., when both source and destination mobile units 410(1) are IPv6 enabled. For example, when the MFE receives a packet from the mobile, the IP address of the other MFE is added in the route header as an intermediate hop before getting to the destination.

In some embodiments, the mobility forwarding entities 420 may also provide support for services such as header compression and encryption of traffic flows during the forwarding process. For instance, the source and destination mobility forwarding entities 420 can derive an encryption and traffic authentication key during the authenticated key agreement phase in order to encrypt and sign traffic flows. In a similar vein, the registration procedures allow the mobile units 410 to delegate the network to provide such performance enhancements while the network can verify if such services are authorized for the mobile.

Each of the mobility routing entities (MRE) 425 maintains a database that stores the visited coordinates of mobiles 410. The database coordinates include the IP address of the mobility forwarding entities 420 that are registered each mobile unit 410 and the domain name or identity of the registered mobility forwarding entity 420. Each mobile unit 410 may therefore be addressable using a home IP address and the mobility routing entities 425 may provide the coordinates of the visited network relevant for secure proxy-based route optimization operation. In one embodiment, the mobility routing entity 425 may be implemented as a distributed database consisting of local databases created and maintained at different locations. The distributed mobility routing entity 425 may nevertheless function as one single integrated database when queried. In general, the mobility routing entities 425, respond to queries from an MFE 420, respond to queries from another MRE 425, and update the database when mobility events occur.

The mobility routing entities 425 use the database to locate mobility forwarding entities 420 associated with mobile units 410. For example, a mobility routing entity (MRE) 425(1) may receive a request from a mobility forwarding entity 420(1) for the identity and/or location of another mobility forwarding entity 420(2) associated with the mobile unit 410(2): The MRE 425(1) may respond with the visited coordinates of the mobile unit 410(2) and/or the addressing information that indicates the mobility forwarding entity 420(2), if the information is available locally. If the information is not available locally, for example if the mobile unit 410(1) is trying to contact the mobile unit 410(3), the MRE 425(1) may contact another MRE 425(2) in the home network of the mobile unit 410(3) to obtain the visited coordinates of the mobile unit 410(3) and/or the mobility forwarding entity 420(3). This information is then shared with the MFE 420(1) and may also be cached for the future. If the MRE 425(1) is unable to resolve the query in 'reasonable' time, it may return a "coordinates unknown" message back to the MFE 420(1). This result may not be catastrophic, since the 'default' route through the mobile's home gateway is not precluded.

In one embodiment, when an MRE 425(1) contacts another MRE 425(2) in a mobile unit's home network, the IP address (or domain name) of the MRE 425(2) may not be known by the MRE 425(1). For example, the MREs 425 may not know each other's IP addresses or domain names when the mobile host's operator is different from the contacting MRE's operator. This problem can be resolved by a two step process. First the local MRE 425(1) reaches out to its own home MRE, which is maintained by the same operator as the local MRE 425(1) and forwards the request it received from MFE 420(1). If the information is available locally then it is passed on to the local MRE 425(1). If not, the 'home MRE' then reaches out to the 'home MRE' of the mobile (in the relevant operator's domain) and obtains the visited coordinates of the mobile. There are two underlying assumptions in the above embodiment. First, the MRE in the home network can be assumed to work with the home gateway to maintain its local databases. Second, each operator can designate one or more MRE's as 'home MRE's' and in addition these elements maintain the coordinates of various 'home MRE's' in other operator networks. In other words, the MREs can be organized into a hierarchical distributed database that works across operator boundaries. This can be easily achieved by having one local MRE per visited network, and one 'home MRE' per home gateway. Additional MRE's may be added locally and otherwise for redundancy purposes. Moreover visited networks can then share information with local MREs with coordinates of mobiles attached to their networks. As observed earlier, the information obtained using this querying process can be cached for later use by every one of the MRE's involved. In one embodiment, there may be an expiry time associated with the cached information.

The mobile units 410 may continue to roam throughout the wireless communication system 400 and so the wireless communication system 400 may support macro-mobility functionality. In one embodiment, when a mobile unit 410 switches from one visited gateway to another, the home gateway of the mobile unit 410 is informed. For example, in emerging networks, a proxy mobile IP binding update and acknowledgement between the target visited gateway and home gateway may be used to support macro-mobility. In the event of an update/acknowledgment, the visited gateways involved can update corresponding local MRE databases and the home gateway can update the home MRE. The nature of the database update (i.e., event based push or periodic pull) is a matter of design choice.

When an MFE 420 requests for information from an MRE 425, information cached in the MRE 425 may potentially be stale and the MRE 425 may be unaware that the cached information has become stale. When the MFE 420 uses stale information and contacts the visited network of the mobile unit 410, then it may become clear that the information is stale. Under such circumstances, the source MFE 420 may query the MRE 425 again with the additional indication that the information it received in the previous query is stale. The MRE 425 may delete the cached entry and go back to the MRE 425 in the home network of the mobile unit 410 to obtain the coordinates of the mobile unit 410 (as discussed earlier) to obtain the visited coordinates of the mobile unit 410. When this event occurs, the 'call' continues between the mobile units 410 through the default routes. Subsequently, once optimal routes are confirmed and set-up, forwarding of packets along optimal paths can take place.

The wireless communication system 400 may implement various security principles to support secure proxy-based route optimization. In one embodiment, network based route optimization is supported only for authorized flows. This is intended to ensure services rendered by the network enforce operator policies and are not available to (unauthorized) adversaries. Moreover, when a flow for a given mobile unit 410 is authorized to receive performance enhancements provided by the secure proxy-based route optimization, the mobile unit 410 may be required to delegate responsibility for modifying packets as needed (e.g., encapsulation, or network address translation, etc.) to the network before the network can perform the secure proxy-based route optimization for flows associated with the mobile unit 410. The network and mobile unit 410 may piggyback, where possible, on existing link layer authentication mechanisms to establish privileges and delegate responsibilities. Network elements involved in route optimization may also share or establish security associations prior to signaling events and exchange of information. This is intended to reduce the likelihood that sessions can be hijacked by unauthorized adversaries. The various security requirements can be enforced for session setup, as well as communications with databases to obtain information and providing updates.

In one illustrative embodiment of a security architecture that can be implemented in the wireless communication system 400, mobile units 410 may authenticate themselves with an access network using existing protocols in standards. The methods for authentication and key agreement may therefore be standards specific. Following successful authentication, the mobile unit 410 and an authentication center (not shown in FIG. 4) can derive an additional key that is used for the secure proxy-based route optimization. The additional key can be derived by the mobile units 410 by modifying the existing key derivation processes. The authentication center in the network can concurrently derive the same key and deliver it to the visited network. For example, in WiMAX and UMB based networks access authentication is based on various EAP methods. More recently, EAP-AKA' has been adopted as the access authentication protocol for evolved HRPD systems as well. The EAP authentication protocol allows the generation of two keys—the MSK and EMSK. The MSK is delivered to the access network, but the EMSK is retained at the AAA for future use. In one embodiment, the secure proxy-based route optimization key can be derived from EMSK. The secure proxy-based route optimization key can then be transferred to the MFE in the visited network and used in the registration phase of the protocol. For another example, in 3GPP based HSPA and LTE networks, access authentication is based on AKA following which the SIM card in the mobile units 410 derived a set of session keys. For HSPA systems, in the networks, AKA uses a vector that includes the session keys which are transferred to the visited gateway which is called the Serving GPRS Support Node (SGSN). For LTE systems, in the network, AKA uses a vector that includes the session keys which are transferred to the Mobility Management Entity (MME). The secure proxy-based route optimization key can be an additional key that is derived and transferred to the appropriate entities within the wireless communication system 400. For example, the MME may then transfer the secure proxy-based route optimization key to the MFE 420.

Transactions that involve the transfer of keys (such as the secure proxy-based route optimization key) should be performed over secure tunnels based on pre-configured security associations. Communications with the MRE 425, particularly database updates due to mobility events, should also be over secure tunnels. This is critical to ensure that databases are not corrupted with erroneous information by adversaries, this could lead to Denial of Service attacks (DoS) called 'route poisoning' which could be catastrophic. Security associations between source MFE and destination MFE may be based on authenticated key agreement protocols. One embodiment implements the use of certificates and subsequent key exchange similar to IKE. One alternative embodiment is the use of Identity Based Encryption (IBE) protocols. The advantage of the IBE based mutually authenticated key exchange is the inherent simplicity (no PKI), while maintaining perfect forward secrecy with no key-escrow.

The secure proxy-based route optimization techniques implemented in the wireless communication system 400 may also be implemented in and/or integrated with existing networks. Embodiments of the secure proxy-based route optimization techniques described herein are applicable to both IPv4 and IPv6 flows and may be applicable to any mobile network independent of access network architecture and protocols. For example, there may be a one-one correspondence between local MREs 425 and MFEs 420 and in some embodiments there may be one MFE 420 per visited gateway, such as the visited gateways 325 shown in FIG. 3. In one embodiment, there may be one home MRE 425 per home gateway, such as the home gateways 330 shown in FIG. 3. For HRPD networks, the MFE 420 may be integrated into the PDSN and the local MRE 425 may be retained as a separate database on a local AAA. Home MREs 425 can be added to existing home AAA servers. For HSPA networks, the local MRE and MFE can be integrated into the SGSN and the home MRE could be integrated into the HSS complex. For WiMAX networks, the MFE can be integrated into the ASN gateway and the MRE can be retained as a separate database on a local AAA. The home MRE can be added to existing home AAA servers. For UMB/CAN networks, the MFE can be added into the AGW and the MRE into the local AAA. For the HRPD, HSPA, WiMAX, and UMB/CAN networks, the MRE 425 and MFE 420 can be implemented as a diameter interface and inter-MRE interfaces may also be implemented as diameter interfaces. For LTE/SAE based EPS networks, the local MRE can be added into the MME and the MFE into the serving SAE gateway. The home MRE server can be integrated into the 3GPP-AAA server or the HSS.

In addition to the above interfaces, if certificates are employed, then MFEs 420 may interface with certificate authorities for provisioning, revocation, and updates of certificates. If IBE based authenticated key agreement is used, then interfaces to a Key Generation Function (KGF) may be provided. Although protocol discussions have typically centered on mobile-to-mobile applications, secure proxy-based route optimization may also be implemented in mobile-to-Internet applications. Moreover, mobile-to-Internet applications may be easier to optimize with the visited MFE offloading traffic to the local Internet POP after network address translation. Packets from the Internet may be routed through the visited MRE since the IP address assigned by the visited MFE corresponds to the routing domain managed by the visited gateway.

Figure 5:
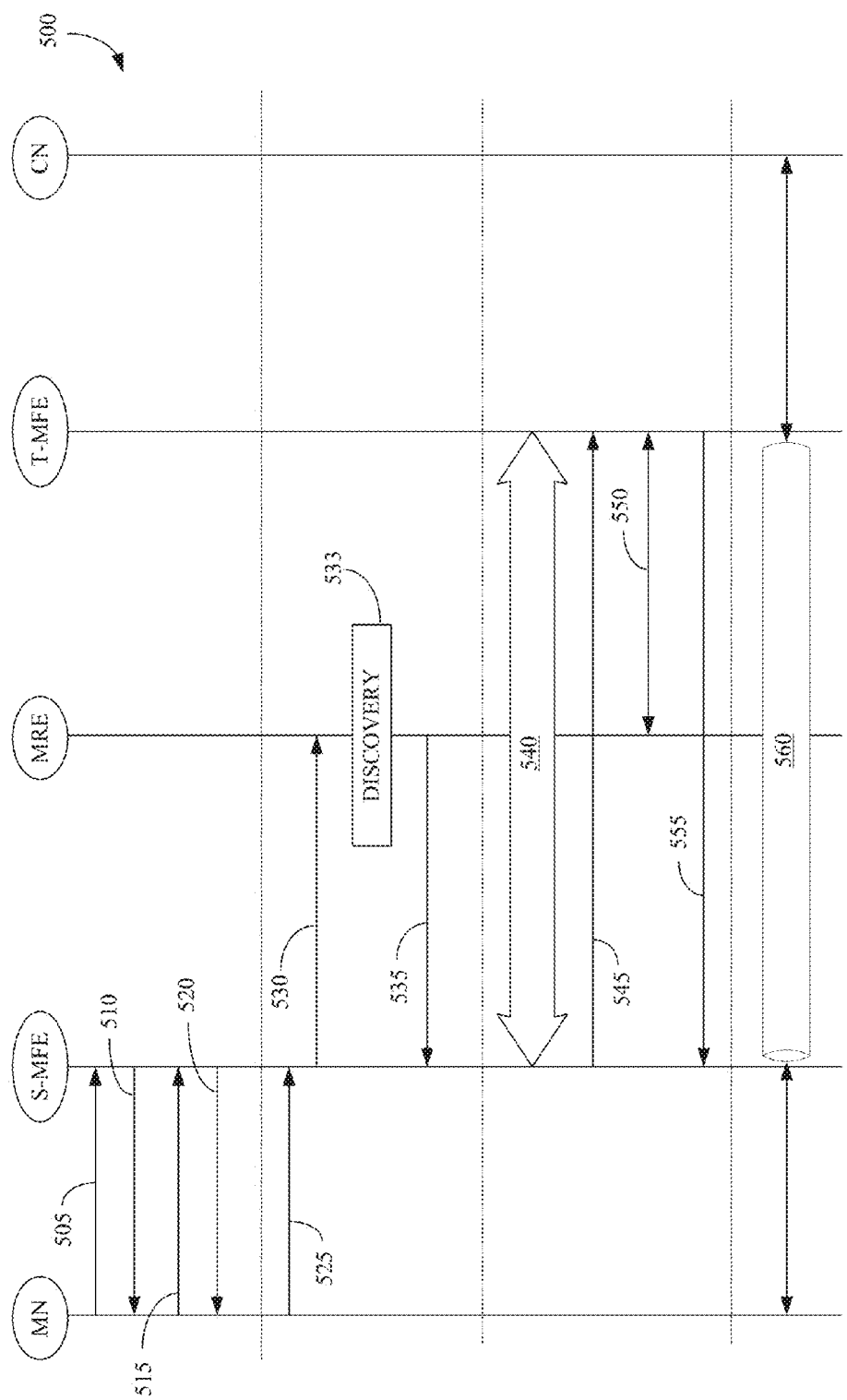
FIG. 5 conceptually illustrates one exemplary embodiment of a method of secure proxy-based route optimization.

FIG. 5 conceptually illustrates one embodiment of a method 500 of secure proxy-based route optimization (SPRO). In the illustrated embodiment, a mobile node (MN) requests (at 505) an advertisement for SPRO (and potentially other services as well) from the source mobility forwarding entity (S-MFE). The S-MFE advertises (at 510) the SPRO services offered and, in the illustrated embodiment, the S-MFE may also advertise (at 510) nonces for registration and delegation. In addition, the S-MFE may advertise (at 510) other services and/or performance enhancements that are offered to the MN. The MN sends (515) a binding registration to the S-MFE. The binding registration from the MN may include the SPRO service identifier (ID). The MN may choose to pick additional services as well. The S-MFE sends (at 520) a binding acknowledgment that may include nonces that the mobile could use for subsequent communication. At this point in method 500, indicated by the dashed line beneath the arrow 520, the MN may be registered with the S-MFE.

The next stage of the method 5(00 includes discovery of a target mobility forwarding entity (T-MFE). The MN picks a nonce received (at 520) and sends (at 525) a request message to the S-MFE with the IP address of the destination correspondent mobile (CN) and the SPRO service ID signed using a session key negotiated with the network for the SPRO service. Since the S-MFE may be unaware of the visited network where the destination mobile is currently anchored, the S-MFE sends (at 530) a secure request to a local MRE with the IP address of the destination mobile (CN). The MRE performs discovery (at 533) of the T-MFE using an appropriate database and returns (at 535) the IP address of the T-MFE as well as the domain name or identity of the T-MFE. At this point in method 500, indicated by the dashed line beneath the arrow 535, the T-MFE has been discovered by the S-MFE and MRE. As discussed herein, in embodiments where the MN is accessing a service provided by a server (not shown in FIG. 5), the other endpoint of the secure route may be the server and not a mobility forwarding entity. Some embodiments of the method 500 may therefore be modified to use an IP address or other identifier to identify or "discover" the server.

The S-MFE executes (at 540) an authenticated key exchange procedure with the T-MFE based on their identities. For example, the authentication may be performed (at 540) using an IBE authentication scheme. Upon authentication, the S-MFE sends (at 545) a signed binding registration to the T-MFE including IP addresses of source and destination mobiles. Prior to sending a binding acknowledgement, the T-MFE may optionally choose to verify the location of the source mobile by contacting (at 550) the local MRE. Upon verification, the T-MFE acknowledges (at 555) the binding (if the destination mobile is in fact anchored at the Target MFE) and that the destination mobile is registered for SPRO with the Target MFE. At this point in method 500, indicated by the dashed line beneath the arrow 555, the T-MFE and the S-MFE share a secure route or tunnel that can be used for forwarding packets associated with the current session or other future sessions between the MN/CN or other communication nodes.

Packets are forwarded (at 560) between source and destination mobile. For example, the packets may be forwarded (at 555) using a secure IP-in-IP tunnel between the T-MFE and the S-MFE. However, persons of ordinary skill in the art having benefit of the present disclosure should appreciate that alternative secure routing and/or tunneling techniques may be used.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A first mobility forwarding entity, comprising:
a memory; and
an electronic processing device configured to:
  register a first mobile device using a session key included in a registration message transmitted by the first mobile device, wherein the session key is derived during access authentication of the first mobile device and is shared by the first mobile device and the first mobility forwarding entity, and wherein reception of the session key in the registration message delegates authority to the first mobility forwarding entity to establish a secure route on behalf of the first mobile device; and
  establish a secure route between the first mobility forwarding entity and a terminating node, wherein the secure route bypasses a first home gateway for the first mobile device, and wherein the secure route is used to transmit packets between the first mobile device and the terminating node, and wherein the packets are encrypted for transmission along the secure route using an encryption key shared by the first mobility forwarding entity and the terminating node.

2. The first mobility forwarding entity of claim 1, wherein the electronic processing device is further configured to:
receive a binding registration from the first mobile device, the binding registration being signed by the first mobile device using the session key; and
transmit a binding acknowledgment to the first mobile device indicating that the first mobile device is registered with the first mobility forwarding entity, which is therefore authorized to establish secure routes on behalf of the first mobile device and perform route optimization for the first mobile device.

3. The first mobility forwarding entity of claim 1, wherein the terminating node is a server configured to provide a web service to the first mobile device, and wherein the electronic processing device is configured to establish the secure route using at least one of an Internet protocol (IP) address or a domain name assigned to the server or the web service.

4. The first mobility forwarding entity of claim 1, wherein the terminating node is a second mobility forwarding entity associated with a second mobile device, and wherein the electronic processing device is configured to: the second mobility forwarding entity in response to a request from the first mobile device to optimize a route to the second mobile device that is registered with the second mobility forwarding entity.

5. The first mobility forwarding entity of claim 4, wherein the electronic processing device is configured to provide a secure request to a mobility routing entity that maintains a distributed database indicating that the second mobile device is registered with the second mobility forwarding entity.

6. The first mobility forwarding entity of claim 5, wherein the electronic processing device is configured to provide an address of the second mobile device and receive at least one of an address or an identity of the second mobility forwarding entity.

7. The first mobility forwarding entity of claim 1, wherein the electronic processing device is configured to generate the encryption key shared by the first mobility forwarding entity and the terminating node during an authentication key agreement process, and wherein the first electronic device is configured to forward at least one packet from the first mobile device to the terminating node using the secure route.

8. The first mobility forwarding entity of claim 7, wherein the electronic processing device is configured to establish a secure tunnel between the mutually authenticated first mobility forwarding entity and the terminating node using the encryption key to encrypt packets conveyed by the secure tunnel.

9. The first mobility forwarding entity of claim 7, wherein the electronic processing device is configured to create a co-located care-of address for the first mobile device, and wherein the electronic processing device is configured to use network address translation to route packets associated with the first mobile device based on the care-of address.

10. The first mobility forwarding entity of claim 7, wherein the electronic processing device is configured to define at least one router header including an IP address of the terminating node as an intermediate hop, wherein said at least one router header can be appended to packets received from the first mobile device.

11. The first mobility forwarding entity of claim 1, wherein the electronic processing device is configured to retain the secure route between the first mobility forwarding entity and the terminating node after establishing a first call session between the first mobile device and the terminating node so that the secure route can be used to forward at least one packet associated with a second call session.

12. The first mobility forwarding entity of claim 1, wherein the electronic processing device is configured to establish the second call session between the first mobile device and the terminating node by transmitting a registration message that comprises source and destination ports for the first mobility forwarding entity and the terminating node.

13. A mobility routing entity comprising:
a memory; and
an electronic processing device configured to:
receive, from a first mobility forwarding entity that has registered a first mobile device using a session key derived during access authentication of the first mobile device and shared by the first mobile device and the first mobility forwarding entity, a request to discover a second mobility forwarding entity that has registered the second mobile device, the request including an address of the second mobile device, and wherein reception of the session key authorizes the first mobility forwarding entity to establish secure routes on behalf of the first mobile device;
discover at least one of an address or an identity of the second mobility forwarding entity using the address of the second mobile device and a database maintained by the first mobility routing entity; and
provide said at least one address or identity of the second mobility forwarding entity to the first mobility forwarding entity so that a secure route that bypasses first and second home gateways for the first and second mobile devices can be established between the first and second mobility forwarding entities, and wherein packets are encrypted for transmission along the secure route using an encryption key shared by the first mobility forwarding entity and the second mobility forwarding entity.

14. The mobility routing entity of claim 13, wherein the electronic processing device is configured to access the address of the second mobility forwarding entity from the database using said at least one address or identity of the second mobile device when the database contains a previously determined association between said at least one address or identity of the second mobility forwarding entity and the address of the second mobile device.

15. The mobility routing entity of claim 13, wherein the electronic processing device is configured to:
query, when the database does not contain a previously determined association between said at least one address or identity of the second mobility forwarding entity and the address of the second mobile device, at least one other mobility routing entity or at least one other entity to obtain information associating said at least one address or identity of the second mobility forwarding entity and the address of the second mobile device;
add the association between said at least one address or identity of the second mobility forwarding entity and the address of the second mobile device to the database; and
provide said at least one address or identity of the second mobility forwarding entity to the first mobility forwarding entity.

16. The mobility routing entity of claim 13, wherein the mobility routing entity is distributed through multiple mobility routing entities deployed at different locations, and wherein the electronic processing device is configured to receive the request at one of the multiple mobility routing entities.

17. The mobility routing entity of claim 16, wherein the database is distributed through the multiple mobility routing entities and wherein the electronic processing device is configured to search the distributed database using the address of the second mobile device.

18. A first mobile device associated with a first home gateway and comprising:
a memory; and
an electronic device configured to:
register the first mobile device with a first mobility forwarding entity using a session key included in a registration message transmitted by the first mobile device, wherein the session key is derived during access authentication of the first mobile device and is shared by the first mobile device and the first mobility forwarding entity, and wherein reception of the session key in the registration message authorizes the first mobility forwarding entity to establish secure routes on behalf of the first mobile device;
transmit, to the first mobility forwarding entity, a request to establish a secure route between the first mobility forwarding entity and a terminating node using the session key, the secure route bypassing the first home gateway; and
transmit, to the first mobility forwarding entity, at least one packet for transmission over the secure route towards the terminating node, and wherein the at least one packet is encrypted for transmission along the secure route using an encryption key shared by the first mobility forwarding entity and the terminating node.

19. The first mobile device of claim 18, wherein the electronic processing device is configured to:
provide a request to the first mobility forwarding entity to register for route optimization; and
receive a response from the first mobility forwarding entity indicating availability of route optimization.

20. The first mobile device of claim 19, wherein the electronic processing device is configured to receive a response indicating at least one additional service provided by the first mobility forwarding entity and a nonce associated with at least one service provided by the first mobility forwarding entity.

21. The first mobile device of claim 18, wherein the electronic processing device is configured to provide a binding registration to the first mobility forwarding entity, the binding registration being signed by the first mobile device using the session key.

22. The first mobile device of claim 21, wherein the electronic processing device is configured to receive a binding acknowledgment indicating that the first mobile device is registered with the first mobility forwarding entity, which is therefore authorized to perform route optimization for the first mobile device.

23. The first mobile device of claim 18, wherein the terminating node comprises at least one of a server and a second mobile device associated with a second mobility forwarding entity, and wherein the electronic processing device is configured to transmit a request including at least one of an IP address associated with the terminating node or a request to discover the second mobility forwarding entity.

* * * * *